United States Patent
Iversen

(10) Patent No.: US 8,402,387 B1
(45) Date of Patent: Mar. 19, 2013

(54) ADVERTISING BASED ON USER MODELS

(75) Inventor: Grim Iversen, Trondheim (NO)

(73) Assignee: Google Inc., Mountain View, CA (US)

(*) Notice: Subject to any disclaimer, the term of this patent is extended or adjusted under 35 U.S.C. 154(b) by 1150 days.

(21) Appl. No.: 12/109,279

(22) Filed: Apr. 24, 2008

(51) Int. Cl.
*G06F 3/048* (2006.01)

(52) U.S. Cl. ................................. 715/789

(58) Field of Classification Search ............... 715/789
See application file for complete search history.

(56) References Cited

U.S. PATENT DOCUMENTS

| | | | |
|---|---|---|---|
| 6,937,996 B1* | 8/2005 | Forsythe et al. ............... 705/16 |
| 6,981,040 B1 | 12/2005 | Konig et al. |
| 7,320,031 B2 | 1/2008 | Konig et al. |
| 7,801,956 B1* | 9/2010 | Cumberbatch et al. ....... 709/204 |
| 2006/0100892 A1* | 5/2006 | Ellanti ............................. 705/1 |
| 2006/0242013 A1* | 10/2006 | Agarwal et al. ................ 705/14 |
| 2007/0027761 A1* | 2/2007 | Collins et al. .................. 705/14 |
| 2008/0307516 A1* | 12/2008 | Levy-Abegnoli et al. ....... 726/9 |
| 2009/0129278 A1* | 5/2009 | Kumar et al. ................. 370/241 |
| 2009/0171780 A1* | 7/2009 | Aldrey et al. .................. 705/14 |

* cited by examiner

*Primary Examiner* — Sara England

(74) *Attorney, Agent, or Firm* — Fish & Richardson P.C.

(57) ABSTRACT

A generic model of behavior pattern of general users is established. Information about a specific user is obtained from one or more electronic messages associated with the specific user, and a specific model of behavior pattern of the specific user is established based on the information about the specific user. Ads are identified based on the generic model and the specific model.

27 Claims, 5 Drawing Sheets

ADVERTISING BASED ON USER MODELS

BACKGROUND

The description relates to information management.

On-line advertisements allow advertisers to reach a wide range of viewers through the Internet. The selection of advertisements for display, such as with search results and other information, and the ordering of those advertisements, may be achieved by various techniques. In one example, an initial determination is made to identify all advertisements that are a match or near match for the applied search terms or other query items or information. The match may be made, for example, between one or more words in a query, and keywords identified by an advertiser and associated with a particular advertisement or group of advertisements, such as a campaign. For example, a company selling fishing tackle may have a line of large lures, and may thus identify terms such as "lunker," "sturgeon," and "muskie fever" as keywords to associate with their advertisements for such large lures. Those advertisements may then be considered by the system for display when a search results are displayed to a user who enters such terms.

The comparison can be made between a search or query, and the text in an advertisement or the text in a target of a hyperlink in an advertisement, or to a combination of keywords, target text, and advertisement text, among other possible techniques. For example, the system may effectively select terms from an advertisement as keywords so that the advertisement is selected for possible display when a search or other user action associated with the keywords is submitted. An advertisement may be selected for possible display if there is a "near" match also, for example, if a query includes terms that are known synonyms, mistypings, or misspellings of the keyword terms for an advertisement.

SUMMARY

This document describes targeting ads based on predicted behaviors of users. For example, behavior of a particular user can be predicted using a generic model of general users and a specific model of the particular user. The specific model can be established based on information specific to the user, which can be gathered from electronic messages, such as e-mail and instant messages. Selectively providing ads to users based on the generic and specific user models allows advertisers to target ads more effectively and allows users to have a better experience by receiving ads that are more relevant.

In general, in one aspect, a generic model of behavior pattern of general users is established; information about a specific user is obtained from one or more electronic messages associated with the specific user; a specific model of behavior pattern of the specific user is established based on the information about the specific user; and ads are identified based on the generic model and the specific model.

Implementations may include one or more of the following features. New information can be obtained from a new message associated with the user, and ads can be identified based on the new information, the generic model, and the specific model. The one or more electronic messages can include an e-mail, an instant message, or a search query. The generic model can include a set of activities. The generic model can include a timeline of predetermined types of activities. The specific model can include a set of activities associated with the specific user. The specific model can include a timeline of known or planned activities associated with the specific user. The specific model of behavior pattern can provide information about a possible future behavior of the specific user based on current information about the specific user.

Establishing a specific model of behavior pattern can include establishing the specific model of behavior pattern based on the generic model of behavior pattern of general users. Establishing a generic model of behavior pattern of general users can include establishing a generic model of travel or purchase behavior pattern of general users. Obtaining information about the specific user can include obtaining travel information about the specific user. Obtaining travel information about the specific user can include obtaining a confirmation from an airline service, a car rental service, or a hotel service. Identifying ads based on the generic model and the specific model can include identifying car rental ads when information about the specific user indicates that the specific user is traveling to a distant location and has not received a car rental confirmation. Identifying ads can include identifying the ads based on information indicating whether the user is staying at a location away from home during a weekend or during a business day.

In general, in another aspect, models of behavior patterns are established based on information obtained from electronic messages associated with users; an effectiveness of an ad for various models are determined; and a recommendation for an ad strategy is provided based on the determination of the effectiveness of the ad for various models.

Implementations may include one or more of the following features. A determination that the ad has a higher effect on users associated with a particular model than other models is made, and a recommendation is provided to increase an ad budget for targeting users associated with the particular model.

In general, in another aspect, ads to be delivered to a specific user are identified based on current information about the user, a generic model of behavior pattern of general users, and a specific model of behavior pattern of the specific user. The specific model is established based on the information about the specific user obtained from one or more electronic messages associated with the specific user.

Implementations may include one or more of the following features. The specific model can be updated using new electronic messages associated with the specific user. Generic models of two or more domains can be established, each domain being associated with a field of activity. The current information can be associated with a particular domain, and the ads can be identified based on the generic model associated with the particular domain.

In general, in another aspect, a generic model generator is provided to establish generic models of behavior patterns of general users; a messaging server is provided to obtain information about a specific user from one or more electronic messages associated with the specific user; a specific model generator is provided to establish a specific model of behavior pattern of the specific user based on the information about the specific user; and an ad server is provided to identify ads based on the generic model and the specific model.

Implementations may include one or more of the following features. The messaging server can includes an e-mail server or an instant messaging server. A parser parses the electronic messages to determine facts or events associated with the users. The parser establishes fact timelines or event timelines associated with the users. The specific model of behavior pattern can provide information about a possible future behavior of the specific user based on current information about the specific user. The generic model can include a generic model of travel or purchase behavior pattern of general users. The specific model can include a specific model of travel or purchase behavior pattern of the specific user. The messaging server can examine messages received by the specific user to identify a confirmation from an airline service, a car rental service, or a hotel service. The specific model can include a rule specifying one or more services that are likely needed or not needed by the specific user when the specific user travels from a first location to a second location. The rule can specify that if the user's residence is within a predefined distance of the second location, the user does not need hotel service at the second location.

In general, in another aspect, an apparatus includes means for establishing a generic model of behavior pattern of general users; means for obtaining information about a specific user from one or more electronic messages associated with the specific user; means for establishing a specific model of behavior pattern of the specific user based on the information about the specific user; and means for identifying ads based on the generic model and the specific model.

These and other aspects and features, and combinations of them, may be expressed as methods, apparatus, systems, means for performing functions, program products, and in other ways.

Advantages of the aspects and features can include zero, one, or more of the following. The system can deliver information (e.g., ads) that is more specifically tailored to the user. The users can receive more relevant ads, and the sponsors of the ads can spend ad dollars more effectively.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
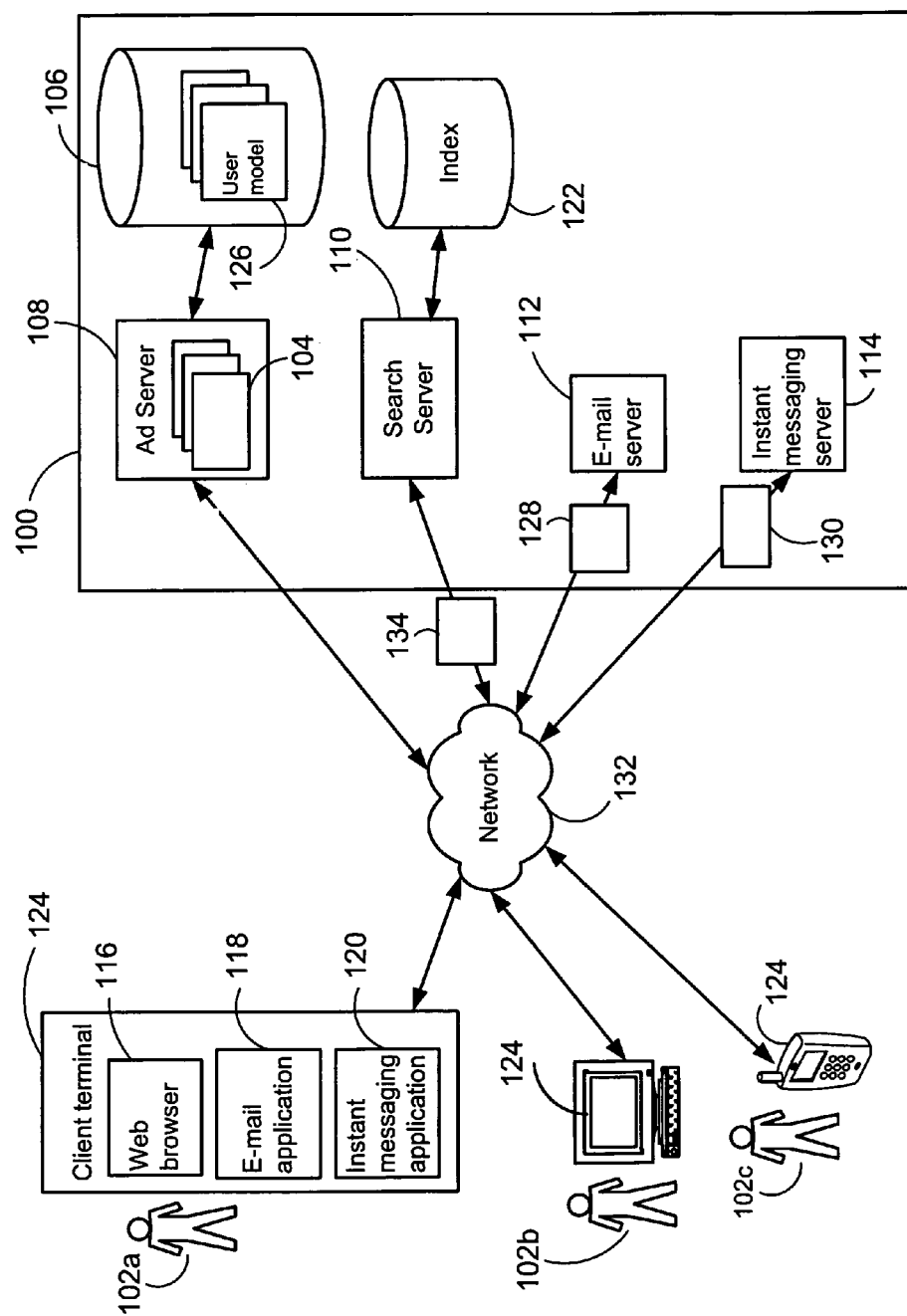
FIG. 1 is a schematic diagram of an information delivery system.

Referring to FIG. 1, an example information delivery system 100 provides messaging services (for example, e-mail and instant messaging services) to users 102. The system 100 provides the users 102 an option to consent to receiving content 104 (for example, advertisements or simply "ads") that are selected based on information in the messages processed by the messaging services and other information about the user that is available to the system 100. The system 100 includes a user model database 106 that stores user models 126 having information about behavior patterns of the users 102. The models 126 may include, for example, generic user models having information about general behavior patterns of the users 102, and specific user models having information about behavior patterns of specific users 102. The system 100 identifies ads 104 based on the messages processed by the messaging services and the user models. This enables the system 100 to provide ads that are more relevant to the users 102.

The content 104 is not limited to advertisements, and can include various types of information useful to the users 102, such as weather information, traffic information, and public announcements.

It is important to respect the privacy of the users 102. Personally identifiable information collected by the system 100 are preferably not distributed to third parties without the consent of the user 102. In some implementations, the system 100 can provide the users 102 with options of enabling or disabling collection of various types of information to support advertisements. A privacy policy may be provided to the users 102 to specify what information is gathered and how the information is used.

The system 100 includes an e-mail server 112 that provides e-mail services to the users 102, and an instant messaging server 114 that provides instant messaging services to the users 102. A search server 110 enables the user 102 to search for information using, for example, a keyword search.

The user 102 may access the system 100 using a client terminal 124 (for example, personal computer, personal digital assistant, mobile phone, media player, in-vehicle terminal) to access the system 100 through a network 132 (e.g., Internet). The client terminal 124 can include application programs, such as a web browser 116, an e-mail application 118, and an instant messaging application 120. The network 132 can be, for example, a local area network (LAN) or a wide area network (WAN), such as an intranet, an extranet, or the Internet.

In some implementations, when the user 102 accesses a service provided by the system 100, the system 100 selects the ads based on the user models 126 and information associated with the service provided to the user 102. For example, when the user 102 receives e-mails 128 or instant messages, ads 104 sent to the user 102 can be identified based on the user models 126 and information contained in the emails or instant messages. When the user 102 sends a search query 134 to the search server 110, ads 104 sent to the user 102 can be identified based on the user models 126 and search keywords in the search query 134.

When the e-mail server 112 receives an e-mail 128 associated with an account of a user 102, information is extracted from the e-mail 128 by, for example, examining the subject lines, comparing the sender's address with known addresses, and examining the body of the e-mail 128. The user models 126 are updated based on the information extracted from the e-mail 128. The ad server 108 selects one or more ads 104 based on information extracted from the e-mail 128 and the user models 126, and sends the selected ads 104 to the e-mail server 102. For example, when the e-mail 128 includes an airline reservation confirmation, the ad server 108 may identify ads 104 related to hotels and car rentals.

In some examples, the e-mail sever 112 inserts the ads 104 into the e-mail 128. For example, the ads 104 may appear near the edge of a viewing pane, so that the user 102 sees the hotel or car rental ads when reading the e-mail 128 that includes the airline confirmation. The ads 104 can also be e-mail ads, in which the e-mail server 112 sends the e-mail ads related to hotels and car rentals after delivering the airline confirmation e-mail 128.

In a similar manner, when the instant messaging server 114 receives an instant message 130 associated with an account of a user 102, information is extracted from the instant message 130, and ads are identified based on the extracted information and the user models 126. The instant message server 114 can insert ads 104 into the instant message 130, or deliver instant message ads to the user 102 after delivering the instant message 130.

The search server 110 enables the user 102 to search for information using, for example, a keyword search. The user 102 may access the search server 110 through the web browser 116 by sending a search query 134 to the search server 110. The search query 134 may include one or more search keywords. In response, the search server 110 searches an index 122, returns a list of documents (e.g., web pages) having keywords that match the search query submitted by the user 102, and provides the list of documents in a sequence according to rank scores of the documents. The search server 110 may also cause ads 104 to be displayed alongside the list of returned documents.

The search server 110 sends the keywords in the user's search query to the ad server 108. The ad server 108 selects ads 104 based on several criteria. In some examples, the criteria include how close the keywords associated with the ads 104 match the keywords in the user's search query. In some examples, the criteria include how close the keywords associated with the ads 104 match the content of the documents provided by the search server 110. The ad server 108 also determines a score for the ads 104 based on the user models 126. If a user model 126 indicates that the user 102 may be more likely to be interested in a particular ad, the score for that ad is increased, and vice versa. The ad server 108 selects ads ranked according to the criteria specified above and sends the selected ads to the search server 110. The search server 110 sends the search results and the ads 104 to the user 102. Some ads, such as video ads, may require the web browser 116 to connect to the ad server 108 to stream data (e.g., video) from the ad server 108.

Figure 2:
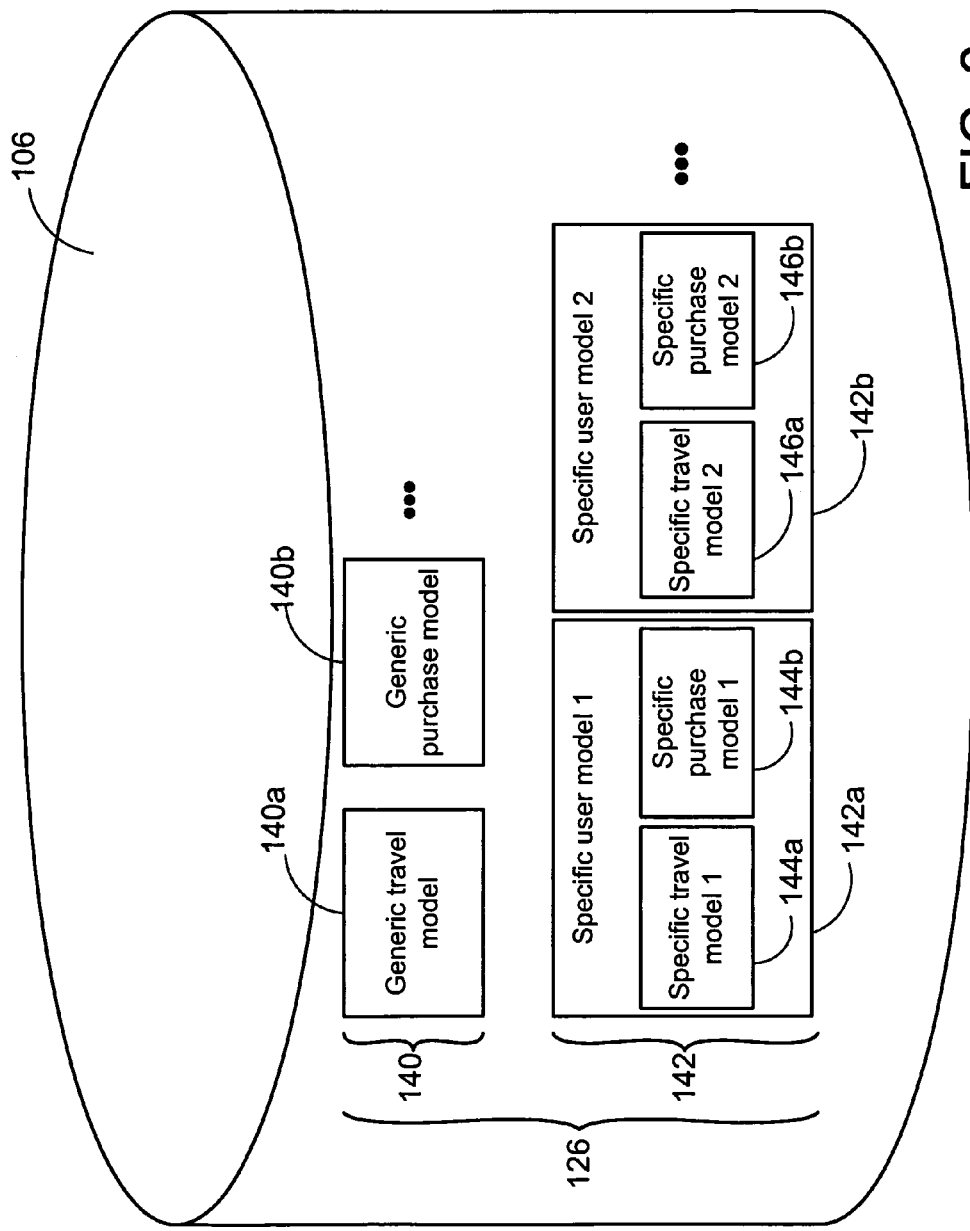
FIG. 2 is a schematic diagram of user models.

Referring to FIG. 2, the user models 126 can include generic user models 140 and specific user models 142. Various generic user models 140 can be established for different "domains", each domain being associated with a field of activities. For example, a generic travel model 144a can include information about the common patterns of travel behavior and can be used to assist delivery of high quality ads to travelers or people planning to travel.

A generic purchase model 140b can include information about common patterns of purchase behavior and can be used to assist delivery of high quality ads to shoppers or people planning to purchase items. For example, a purchase model may indicate that a purchase of a component used to assemble a computer is usually accompanied by purchases of other computer components. The computer components can include, for example, central processing units (CPUs), dynamic random access memory (DRAM) modules, and non-volatile storage devices, such as hard disk drives, optical disc drives, and flash memory.

Each specific model 142 is associated with a specific user 102. For example, a specific user model 142a can be associated with a first user 102a, and a specific user model 142b can be associated with a second user 102b. Each specific user model 142 can include models associated with specific domains. For example, the specific user model 142a can include a specific travel model 144a that includes information about the travel behavior of the user 102a, and a specific shopping model 144b that includes information about the purchase behavior of the user 102b.

Figure 3:
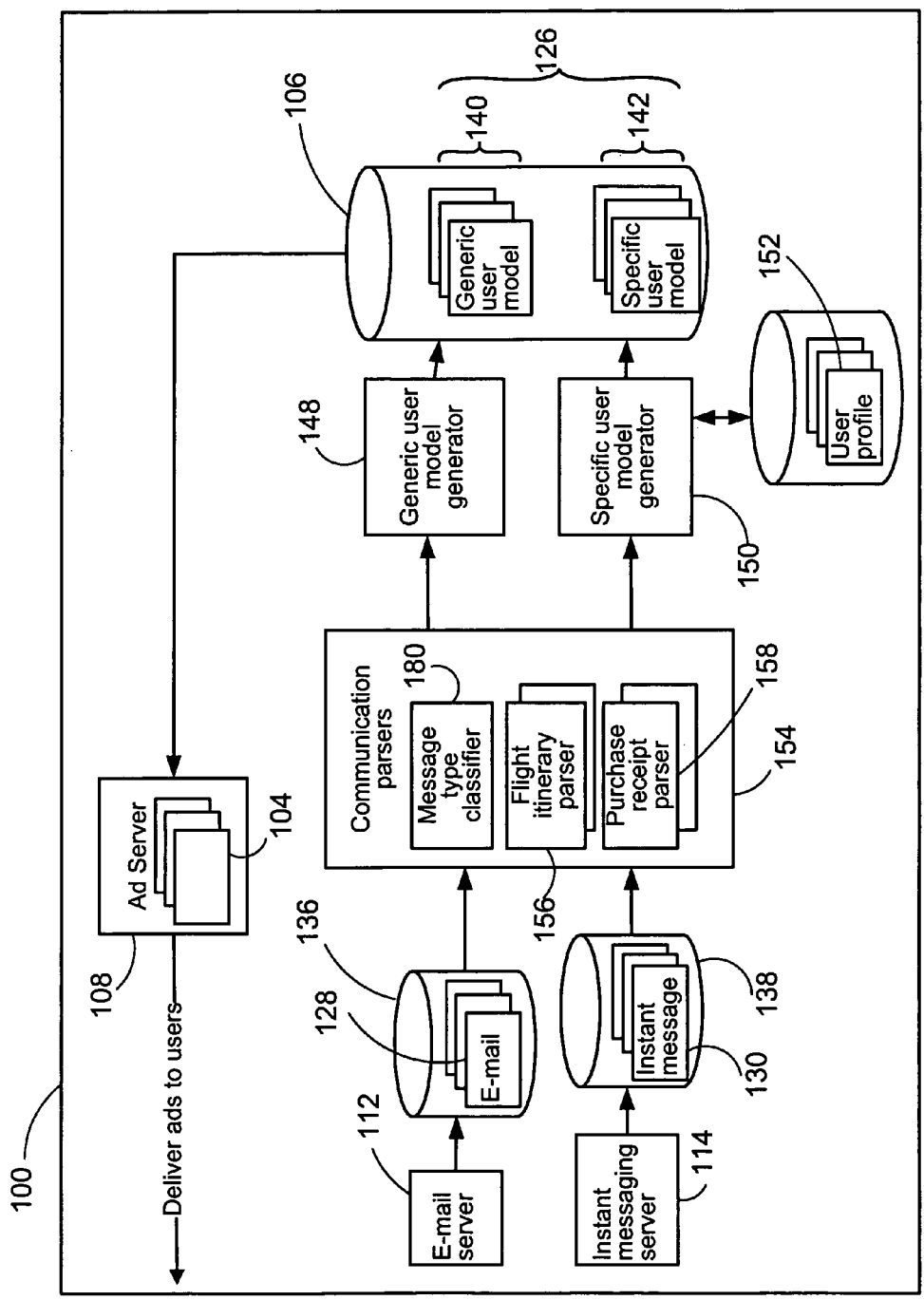
FIG. 3 is a schematic diagram of components of the information delivery system for establishing the user models.

Referring to FIG. 3, the e-mail messages 128 processed by the e-mail server 112 are stored in an e-mail repository 136, and the instant messages 130 processed by the instant messaging server 114 are stored in an instant message repository 138. The e-mails and instant messages can be used to generate generic and specific user models.

In general, models can be defined based on a set of known activities. For example, the activities can include "flying", "eating at restaurant", "driving car", "renting car", "staying at hotel", or "visiting cinema", etc. Each of the activities can be augmented by geographic (indicating where the activities occurred) and date-information (indicating when the activities occurred). For each user, a time line of the known or planned events can be generated. For each known event, there can be a set of message-parsers (e-mail parser, instant message parser, etc.) specifically trained to identify the event in the users communication and extract related information. In some implementations, a time line of known or planned activities, or a specific user model, can be constructed for each user.

In some implementations, a message type classifier 180 parses incoming messages (e.g., e-mails 128 and instant messages 130) to determine their categories or types. Different types of messages are sent to different communication parsers 154 that listen for events of known types and outputs the events to a fact time-line associated with the user 102. For example, the message type classifier may identify messages that have formats and contents that resemble travel itinerary, airline ticketing confirmations, car rental confirmations, and/or hotel confirmations. The information extracted from these messages can be used to establish user models for travel.

Similarly, the message type classifier 180 may identify messages that have formats and contents that resemble, for example, purchase order confirmations, order delivery schedules, and/or credit card statements. The information extracted from these messages can be used to establish user models for purchase activities.

Each parser 154 can be configured to output records each containing a piece of information about a fact (or prediction) about the user 102. For example, the communication parsers 154 can include a flight itinerary parser 156 that specializes in parsing information from flight itineraries, and a purchase receipt parser 158 that specializes in parsing information from purchase receipts.

Each record can include a name, a description, and a set of parameters that provide details of the fact or prediction. For example, a piece of information may indicate that a user 102 stayed at a certain hotel and attended a certain conference on a certain date, or that the user 102 will be at a particular airport to board a particular flight on a certain date. The system 100 may store a record having the name of the hotel and date of stay as parameters, a record having the name of conference and data of conference as parameters, or store a record having the name and location of the airport as parameters.

In this description, the term "fact" depending on context can mean a fact or an activity that has occurred, or a prediction of a fact or an activity that may occur. A fact related to a user 102 can be inferred from information associated with the user 102 that is processed by the system 100, so the accuracy of the fact learned by the system 100 depends on the accuracy and completeness of the information. For example, the system 100 may process a travel itinerary indicating that the user 102 traveled to a certain city on a certain date, but in fact the user 102 may have canceled the trip on the phone. The system 100, not knowing that the user 102 canceled the trip, stores a record having information indicating that the user 102 traveled to the certain city on the certain date. The system 100 may have built-in intelligence to update old information based on new information. For example, if the system 100 receives an airline confirmation indicating that the user 102 plans to travel to a city different from that shown on an earlier travel itinerary, the system 100 may update the travel information of the user 102 based on the more recent airline confirmation.

The following describes an example of extracting information from an e-mail 128 containing travel confirmation. The system 100 parses the e-mail 128 and decides that the e-mail 128 is a flight itinerary. The e-mail 128 is sent to a flight itinerary parser 156 for parsing facts contained in the flight itinerary. For example, for an outbound flight (meaning that the user 102 is traveling away from home), the flight itinerary parser 156 may output the following fact timeline associated with the user 102:

Timeline 1:
 Fact type: "At airport (origin of travel)"
  Parameters: Airline, Airport code, TimeStamp
 Fact type: "Flying"
  Parameters: Airline, time period of flight
 Fact type: "At airport (destination of travel)"
  Parameters: Airline, Airport code, TimeStamp
Timeline 2:
 Fact type: "Temporarily living away from home"
  Parameters: geographic location, time period
 Fact type: "Traveling with partner"
  Parameters: Name of spouse or other person
 Fact type: "Traveling with child"
  Parameters: Names of son, daughter, or other person For example, for an home-bound flight, the flight itinerary parser 156 may output the following fact timeline associated with the user 102:

Timeline 3:
 Fact type: "At airport (origin of travel)"
  Parameters: Airline, Airport code, TimeStamp
 Fact type: "Flying"
  Parameters: Airline, Time period of flight
 Fact type: "At airport (destination of travel)"
  Parameters: Airline, Airport code, TimeStamp The facts, without the parameters (or with general parameters that are not specific to a particular user), can represent a generalization of information associated with general users. Patterns of general facts can represent a general behavior of the users. The system 100 can analyze a large number of e-mails 128 and instant messages 130 from a large number of users to establish a large number of fact timelines. The system 100 can detect common patterns of behavior by analyzing the fact timelines and identifying groups of facts that have high correlations and a high probability of occurring together or in time proximity. For example, the system 100 can compute estimates of probabilities of occurrence of a fact A given a fact B.

In some implementations, a generic user model generator 148 uses information extracted from the e-mail messages 128 and instant messages 130 to generate generic user models 140. For example, to generate a generic model for predicting behavior patterns of general users 102 during travel, the generic user model generator 148 may use travel-related fact timelines established by the communication parsers 154 to establish a generic user model 140 for travel. Similarly, to generate a generic model for predicting behavior patterns of general users 102 during shopping, the generic user model generator 148 may use shopping-related fact timelines established by the communication parsers 154 to establish a generic user model 140 for purchase activities.

In some implementations, a specific user model generator 150 uses information extracted from the e-mail messages 128 and instant messages 130 associated with a particular user 102 to generate specific user models 142 for the particular user 102. For example, the specific user model generator 150 may generate a specific model for predicting travel behaviors of the particular user 102 based on travel-related fact timelines established by the parsers 154 based on information extracted from the e-mail and instant messages belonging to the particular user 102. Similarly, the specific user model generator 150 may generate a specific model for predicting shopping behaviors of the particular user 102 based on shopping-related fact timelines established by the parsers 154 based on information extracted from the e-mail and instant messages belonging to the particular user 102.

For example, the system 100 may detect that traveling with an airline is highly correlated with renting a car and staying in a hotel. Thus, the facts "traveling with an airline", "renting a car", and "staying in a hotel" can be grouped together in a "fact group". The detected fact groups can be used directly by the generic user model generator 148 and the specific user model generator 150 in establishing the generic user models 140 and specific user models 142, respectively. The detected fact groups can also be manually edited in which human operators fine-tune the generic and specific user models. The fact groups represent the common-sense knowledge in the system 100 that allows the system 100 to better serve relevant ads 104 to the users 102.

In some implementations, the specific user models 142 for a particular user 102 are updated each time the user 102 sends or receives a new e-mail or instant message that includes relevant information. For example, the specific user model generator 150 may parse the content of the messages and update the specific travel or purchase models if the new message includes travel- or purchase-related information. Because of the large number of messages that need to be processed to update the generic user models, the generic models can be updated periodically or upon instruction of an operator.

Because the user models 126 are updated as new information is available to the system 100, the e-mail server 112 can identify ads 104 based on current information (e.g., the most recent e-mail message 128 or instant message 130), information derived from historical data associated with all users (e.g., the generic user models 140), and information derived from historical data associated with specific users (e.g., the specific user models 142).

The generic user model generator 148 and the specific user model generator 150 may examine the e-mail and instant messages to identify, for example, travel itineraries, confirmations from hotels or car rental services, or purchase order confirmations. The travel itineraries and confirmations from hotels or car rental services can be used to update the travel models and select ads 104 relevant to travel. The purchase order confirmations can be used to update the purchase models and select ads 104 relevant to shopping.

In some implementations, the ad server 108 identifies ads 104 based on both the generic models 140 and the specific models 142. At any point in time, a user 102 can have a time line of facts that the communication parsers 154 have established based on the user's communication. A window of this timeline (an array of ordered facts) can be used to search the set of known behavior models and returning a ranked set of matching models. Each of these models represents possible scenarios describing what the user 102 is currently involved with.

Each matching model can be used to predict future facts for the users 102. For example, if the facts of the user's timeline include an airline travel, a car rental, but no hotel reservation, the model may predict that the user 102 is likely to book an hotel for a certain period of time. Each prediction has a confidence score based on the degree of similarity between the facts of the user's timeline and the matching model of behavior.

Given this data, the system 100 can attach a label to the user 102, e.g., "Looking for a hotel", and allow advertisers to target this group of users with, e.g., ads for shows, etc. The geography parameter of the facts allows this targeting to work in concert with geographic targeting to reach potential customers looking for a hotel in a certain area. This allows ads to be targeted to a predicted set of users and to increase confidence in ads that are targeting this group.

In some implementations, the system 100 can learn which ads are better suited for targeting which general category of users. For example, the system 100 can collect statistics on the performance of groups of ads. By categorizing ads, one can collect information on statistical connection between ad-category and predictions, thereby learning information about which groups of ads perform better for people in certain states or situations according to the behavior models. Because both the facts and the ad-categories are high level constructs (facts generalize over their parameters, and ad-categories generalize across various advertisers), the statistics learned by the system 100 can be applied in other geographic areas, increasing the usefulness of the data. For example, collecting information on statistical connection between ad-category and predictions may teach us that people traveling to a city, without a hotel, may likely click on hotel ads. The system 100 may provide recommendations of ad strategies to advertisers based on the statistical information.

Given enough data, this may allow the system 100 to learn which ads perform better for, e.g., people traveling to London specifically. The collected statistics may allow the system 100 to increase ads where the system 100 has previously collected data that support a connection between the predictions and the ads or ad groups.

In some implementations, the system 100 may provide suggestions on advertising strategy, such as how an ad campaign can be improved by targeting certain general category of users. For example, the system 100 may determine that an ad for a certain product may be more effective to people who are planning to travel than people who are shopping online. The system 100 may recommend the advertiser to increase the ad budget for delivering the ad to people who are planning to travel.

Similarly, in some implementations, the system 100 can learn which ads are better suited for targeting users having specific behavior patterns. For example, the system 100 can collect statistics with more detail, including facts with their parameters (which provide more detailed information related to the facts), and connections between the facts and ad-groups. The system 100 may provide suggestions on advertising strategy, such as how an ad campaign can be improved by targeting users having specific behavior patterns. For example, the system 100 may determine that an ad for a certain product may be more effective to people traveling to New York than people traveling to San Francisco. The system 100 may recommend the advertiser to increase the ad budget for delivering the ad to people traveling to New York.

In some implementations, the system 100 may automatically adjust ad campaigns based on statistical information on effectiveness of an ad for various general categories of users, or users having specific behavior patterns. In the examples above, the system 100 may automatically increase the ad budget or ad bid price for delivering the ad to users who are planning to travel, or automatically increase the ad budget or ad bid price for delivering the ad to users traveling to New York.

The following describes examples of identifying ads to be delivered to users based on information collected from e-mails associated with the users. For example, when a user 102 receives an e-mail that includes a travel itinerary, the ad server 108 identifies ads 104 based on the generic travel model 140 and the specific travel model 144. The generic travel model 140 may include a generic rule specifying that a person having an airline ticket confirmation and a car rental confirmation will likely be less interested in receiving ads related to car rental services. The generic travel model 140 may not have information about whether the user 102 has received a car rental confirmation. The specific travel model 144 may have information indicating that the user 102 already received a car rental confirmation for a particular trip. The combination of the generic travel model 140 and the specific travel model 144 may specifying that the user 102 is likely not interested in receiving car rental ads for the particular trip.

The models 126 provide information about what actions the users 102 may likely take or not take, and what products or services the users 102 may likely need or not need.

For example, suppose a user 102 receives an e-mail message 128 including an airline booking confirmation indicating that the user 102 will travel from location A to location B on a certain date. Based on the e-mail 128 alone, it may appear that the user 102 may need hotel, restaurant, and car rental services at the location B. However, if there is information indicating that location B is near the user's home, then the user 102 will likely not need hotel or car rental service. The likelihood that the user 102 may be interested in restaurant ads is also reduced.

If the user 102 receives a second e-mail message 128 including a reservation confirmation from a car rental service at location B, then it is likely that the user 102 does not need another car rental service. The system can reduce the number of car rental ads sent to the user 102 under this circumstance. The system 100 may deliver ads related to global positioning system (GPS) navigation devices to the user 102. However, if the car rental confirmation indicates that in-vehicle navigation service is included as part of the car rental package, then the user 102 may be less interested in ads promoting navigation devices.

If the user receives a third e-mail message 128 including a reservation confirmation from a hotel at location B, then it is likely that the user does not need to make further hotel reservations. The system 100 can reduce the number of hotel ads sent to the user 102. The system 100 may increase the number of ads relevant to the location of the hotel and the dates that the user 102 will be there.

In the example above, the system 100 does not necessarily stop sending car rental or hotel ads to the user 102 after the user receives messages including confirmation from car rental or hotel services. Some car rental companies may still prefer to send ads to users 102 who have already booked a rental car in the hope that the user 102 may decide to switch cars. Similarly, some hotel owners may still prefer to send ads to users who have already made hotel reservations in the hope that the user 102 may decide to switch hotels.

In the example above, a generic travel model 140a may include generic rules specifying what ads 104 should or should not be delivered to travelers. For example, the generic travel model 140a may include a generic rule specifying that if a user 102 travels from location A to location B, and the user 102 resides near location B, there is a low probability that the user 102 is interested in receiving hotel and car rental ads. A generic rule may specify that if the user 102 receives a hotel or car rental confirmation, there is a low probability that the user 102 is interested in receiving hotel or car rental ads. A generic rule may specify that if the user 102 receives a hotel or car rental confirmation, the system 100 should only deliver hotel or car rental ads for which the sponsors have indicated preference that the ads be delivered regardless of whether the user 102 has a hotel or car rental reservation.

The system 100 may store a user profile 152 having information provided by the user 102, including information such as gender, age, marital status, profession, etc. The specific user models 142 may include information extracted from the user profiles 152.

For example, a generic rule may specify that if a married person travels alone during weekdays, there is a higher probability that the travel is for business (compared to a married person traveling with family or traveling on weekends), and the person may be interested in receiving ads targeting business travelers. A generic rule may specify that if a person travels with family during weekends, there is a higher probability that the travel is for vacation (compared to a married person traveling on weekdays or a person traveling on weekdays), and the person may be interested in receiving ads related to tourist attractions or vacation packages.

For example, a generic rule may specify that if a person travels round-trip on the same day, the person is unlikely to be interested in hotel ads, and is less likely to be interested in ads related to tourism at the destination. A generic rule may specify that if a person travels to and stays at a destination for a week, the person may be interested in ads for hotels and local attractions. A generic rule may specify that if a person books a hotel designated as the official hotel for a large conference, for a period that overlaps the conference dates, there is a higher probability that the person is attending the conference (compared to a person booking a hotel different from the official hotel, or a person booking the official hotel but on days that do not overlap the conference dates), and may be interested in receiving ads related to topics associated with the conference.

For example, a generic travel model may specify that if a person is traveling to New York on a Friday afternoon and leaving the following Monday evening with a confirmed hotel reservation, it is likely not useful to send hotels ads to the person, and that it may be useful to provide ads related to restaurants and weekend entertainment (e.g., Broadway shows) to the person.

A specific travel model (e.g., 144*a*) may include information about travel behavior patterns of the specific user 102. For example, the specific travel model may have historical data indicating that, when the user 102 travels to location B, the user 102 typically rents a car, but when the user 102 travels to location C, the user 102 typically does not rent a car. A specific rule may specify that if the user 102 travels to location B, there is a higher probability that the user 102 may be interested in receiving car rental ads, whereas if the user 102 travels to location C, there is a lower probability that the user 102 may be interested in receiving car rental ads.

For example, the specific travel model can include historical data indicating that when the user 102 travels, 90% of the time the user 102 rents from a particular rental car company, and only 10% of the time does the user rent from other car services. A specific rule may specify that when the user 102 travels, there is a higher probability that the user 102 may be interested in ads showing promotions, such as discounts or upgrade services, from the particular rental car service, and that there is a lower probability that the user 102 may be interested in ads from other car rental services.

For example, the specific model can include information indicating that the user 102 has a young child. A specific rule may specify that, when the user is traveling with the young child, there is a higher probability that the user 102 may be interested in receiving ads for car rentals with child-seat options or ads for kids-friendly restaurants.

For example, the specific model may include data indicating that the user 102 belongs to a particular ethnic group. A specific rule may specify that there is a higher probability that the user 102 may be interested in receiving ads targeting members of the particular ethnic group. For examples, the user 102 may be interested in receiving ads for cultural events, dating services, or restaurants associated with the particular ethnic group.

For example, suppose a user 102*a* receives an e-mail message 128 including a purchase order confirmation indicating that the user 102 has purchased a motherboard and a CPU. The e-mail 128 can be used to update a specific purchase model 144*b* associated with the user 102*a* indicating that the user 102*a* recently purchased a computer motherboard. Suppose the user 102*a* receives a second e-mail message 128 including a purchase order confirmation indicating that the user 102*a* has purchased memory modules and hard disk drives. Based on the second e-mail alone, it may appear that the user 102*a* will be interested in purchasing other computer components, including motherboards and CPUs. When the specific user model 144*b* is taken into consideration, the ad server 108 will know that there is a lower probability that the user 102*a* will be interested in ads for motherboards and CPUs because the user 102*a* just recently purchased those items. The user 102*a* may still be interested in receiving ads related to other computer components, such as CPU coolers, video cards, audio cards, TV tuners, and network routers, etc. The user 102*a* may also be interested in receiving ads related to computer books and magazines, do-it-yourself (DIY) books, DIY magazines, and DIY clubs, etc.

The generic and specific user models allow the system 100 to know, for example, the difference between a business travel and a long weekend travel with family, the difference between a same-day round trip and a week stay, and the difference between a person who has recently purchased a certain item and a person who has not recently purchased the item. This allows the system 100 to deliver ads 104 more specifically tailored to the user 102. The users 102 can receive more relevant ads, and the sponsors of the ads 104 can spend ad dollars more effectively.

The user models 126 established based on information obtained from e-mail messages 128 and instant messages 130 may persist even when the messages have been deleted from the users' accounts. In some implementations, information used to establish the user models 126 may have expiration dates. The system stores the raw data for establishing the user models 126 and keeps track of the expiration dates of the raw data. For example, a specific purchase model may be established based on the purchase history within the past 3 years. Information obtained from purchase order confirmations more than 3 years ago can be removed, and the specific purchase model can be updated based on purchase data obtained within the past 3 years.

Figure 4:
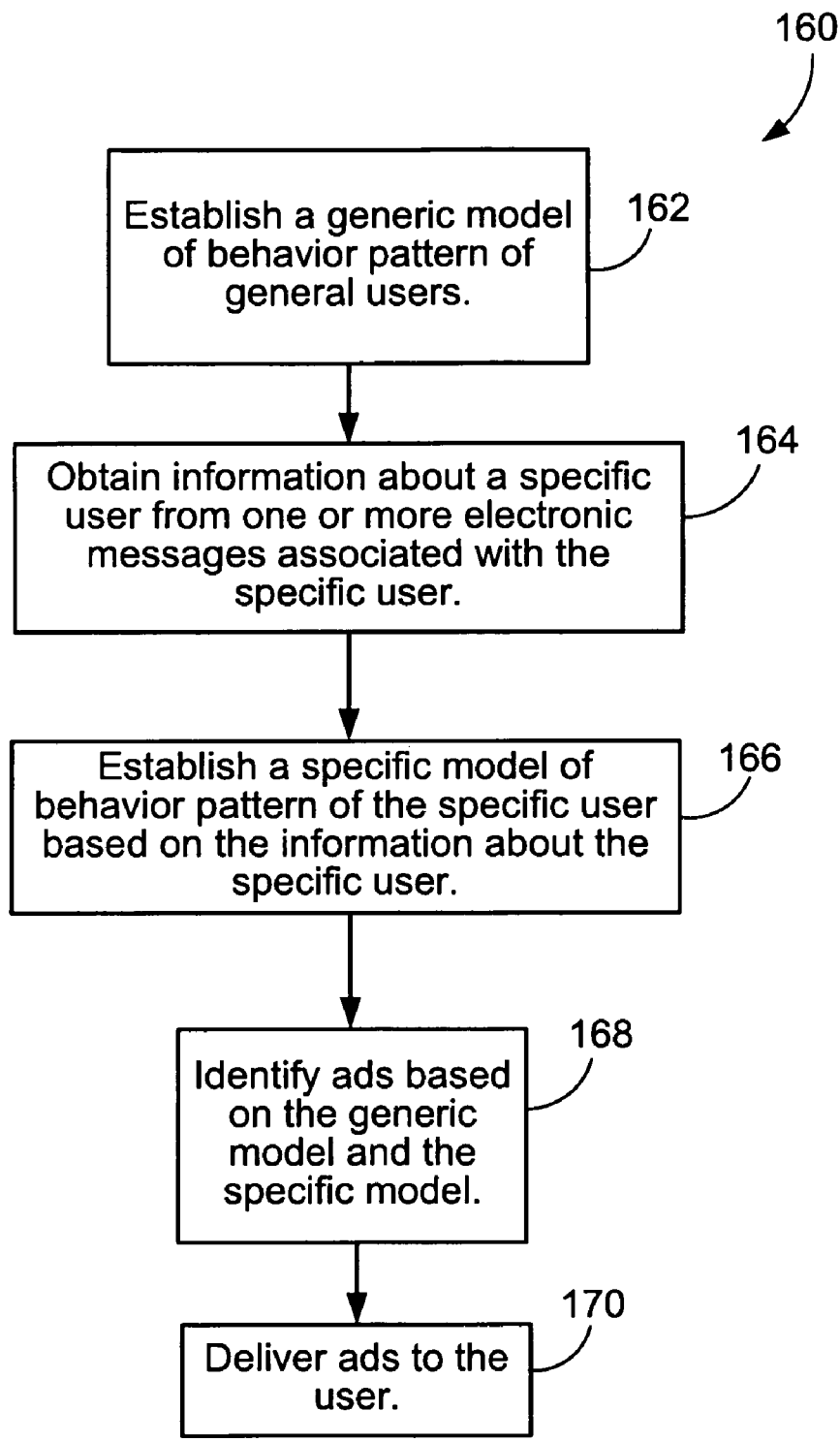
FIG. 4 is a flow diagram of an example process for delivering relevant ads to users.

Referring to FIG. 4, an example process 160 can be used to deliver relevant ads to a user. A generic model of behavior pattern of general users is established (162). For example, the generic model can be a generic model of travel or purchase behavior pattern of general users. The generic model can be established using, for example, the generic user model generator 148 (FIG. 2).

Information about a specific user is obtained from one or more electronic messages associated with the specific user (164). For example, the one or more electronic messages can be an e-mail message, an instant message, or a search query.

The information about the specific user can include, for example, travel information or purchase history associated with the specific user. The travel information can include, for example, a confirmation from an airline service, a car rental service, or a hotel service.

A specific model of behavior pattern of the specific user is established based on the information about the specific user (166). For example, the specific model can be generated by the specific user model generator 150. The specific model of behavior pattern may provide information about a possible future behavior of the specific user based on current information about the specific user. The specific model of behavior pattern can be established based on the generic model of behavior pattern of general users.

Ads are identified based on the generic model and the specific model (168). For example, the ads can be identified by the ad server 108. Identifying ads based on the generic model and the specific model can include identifying car rental ads when information about the specific user indicates that the specific user is traveling to a distant location and has not received a car rental confirmation, and thus may be interested in receiving car rental ads. Identifying ads can include identifying the ads based on information indicating whether the user is staying at a location away from home during a weekend or during a business day.

The ads are delivered to the user (170). For example, the ads can be inserted into e-mail messages or instant messages. The ads can be in the form of separate e-mail or instant messages.

Figure 5:
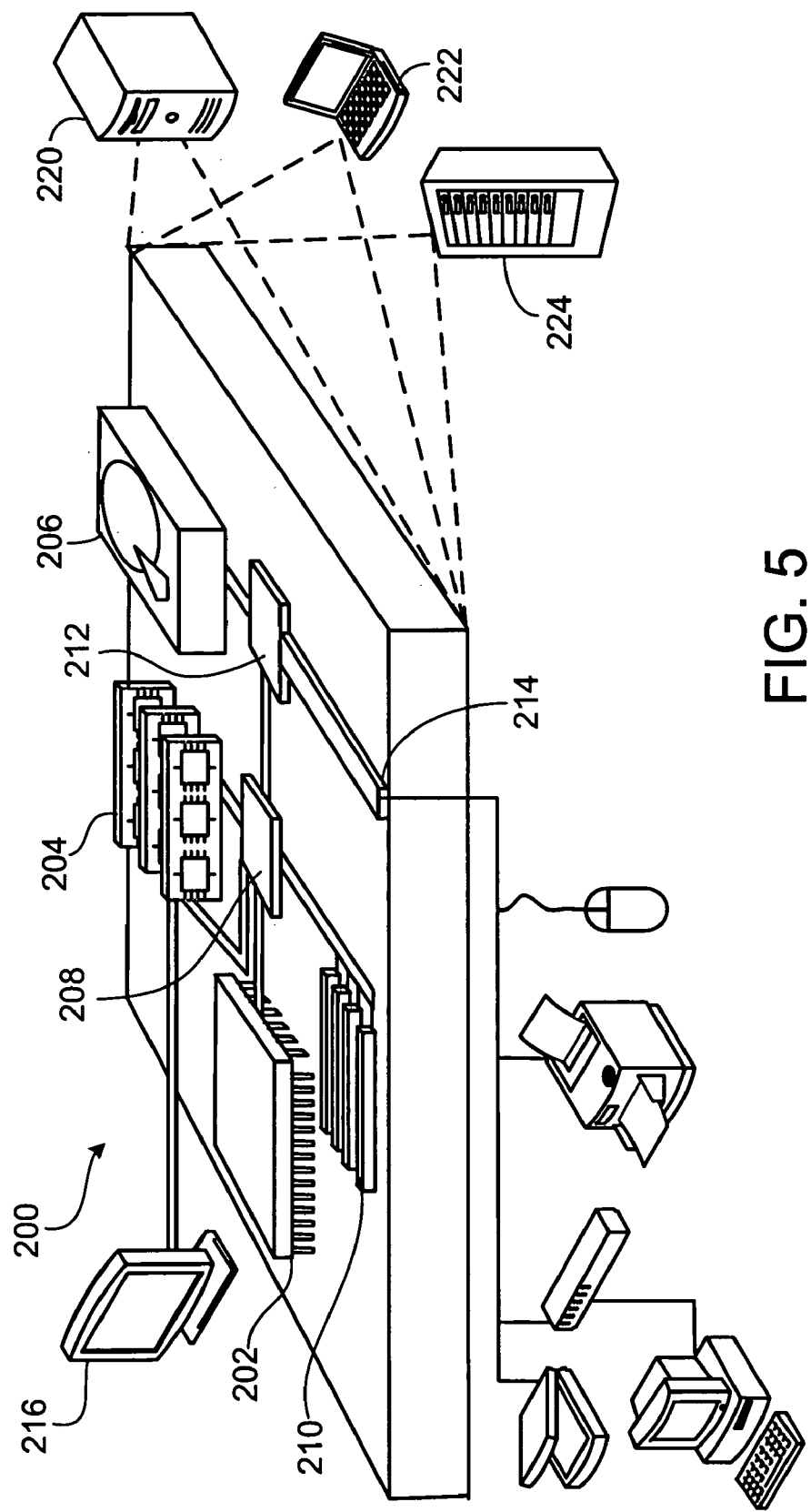
FIG. 5 is a schematic representation of a general computing system.

FIG. 5 is a schematic representation of a general computing system 200 that can be used to implement the system 100 or a component of the system 100, such as the ad server 116 or search server 106. Computing device 200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Each of such devices (e.g., standard server, rack server system, personal computer, and laptop computer) may contain one or more of computing device 200, and an entire system may be made up of multiple computing devices 200 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

In some implementations, both the generic and specific user models are updated each time the user 102 sends or receives a new e-mail or instant message. In some implementations, the generic and specific user models are updated periodically, or upon instruction of an operator. In some implementations, the generic user model generator 148 does not use information from the e-mail and instant messages in establishing the generic user model 140. Rather, the generator 148 may include generic rules specified by an operator based on intuition and experience. The user models 126 can be established for domains other than those described above. The user models 126 can have rules other than those described above.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer implemented method comprising:
    receiving, by one or more computers, electronic messages associated with users;
    identifying the electronic messages as a particular type of electronic message;
    parsing the electronic messages based at least in part on the identified particular type of electronic message;
    establishing timelines of activity patterns of the users based on information obtained from the parsed electronic messages;
    determining a measure associated with an effectiveness of an advertisement for various timelines; and
    providing a recommendation for an advertisement strategy based on the determination of the effectiveness of the advertisement for the various timelines.

2. The method of claim 1, comprising determining that the advertisement has a higher effect on users associated with a particular timeline than other timelines, and recommending increasing an advertisement budget for targeting users associated with the particular timeline.

3. The method of claim 1, wherein at least one the electronic messages comprises a search query.

4. The method of claim 1, wherein the information obtained from the parsed electronic messages comprises information about a format of one of the electronic messages.

5. The method of claim 1, wherein establishing the timelines comprises collecting statistics on performance of groups of advertisements, and assigning categories to at least some of the groups of advertisements.

6. The method of claim 1, wherein at least one of the timelines comprises a timeline of predetermined types of activities.

7. The method of claim 1, wherein at least one of the timelines comprises a timeline of travel activities of one or more users.

8. The method of claim 7, wherein the travel activities comprise activities in connection with an airline service, a car rental service, or a hotel service.

9. The method of claim 1, wherein parsing the electronic messages based at least in part on the identified particular type of electronic message comprises parsing the electronic messages by a parser that corresponds to the identified particular type of electronic message.

10. A system, comprising:
    a data processing apparatus; and
    a memory coupled to the data processing apparatus having instructions stored thereon which, when executed by the data processing apparatus cause the data processing apparatus to perform operations comprising:
    receiving, by one or more computers, electronic messages associated with users;
    identifying the electronic messages as a particular type of electronic message;
    parsing the electronic messages based at least in part on the identified particular type of electronic message;
    establishing timelines of activity patterns of the users based on information obtained from the parsed electronic messages;
    determining a measure associated with an effectiveness of an advertisement for various timelines; and
    providing a recommendation for an advertisement strategy based on the determination of the effectiveness of the advertisement for the various timelines.

11. The system of claim 10, the operations comprising determining that the advertisement has a higher effect on users associated with a particular timeline than other timelines, and recommending increasing an advertisement budget for targeting users associated with the particular timeline.

12. The system of claim 10, wherein at least one the electronic messages comprises a search query.

13. The system of claim 10, wherein the information obtained from the parsed electronic messages comprises information about a format of one of the electronic messages.

14. The system of claim 10, wherein establishing the timelines comprises collecting statistics on performance of groups of advertisements, and assigning categories to at least some of the groups of advertisements.

15. The system of claim 10, wherein at least one of the timelines comprises a timeline of predetermined types of activities.

16. The system of claim 10, wherein at least one of the timelines comprises a timeline of travel activities of one or more users.

17. The system of claim 16, wherein the travel activities comprise activities in connection with an airline service, a car rental service, or a hotel service.

18. The system of claim 10, wherein parsing the electronic messages based at least in part on the identified particular type of electronic message comprises parsing the electronic messages by a parser that corresponds to the identified particular type of electronic message.

19. Non-transitory computer readable media storing software comprising instructions executable by a processing device and upon such execution cause the processing device to perform operations comprising:
   receiving, by one or more computers, electronic messages associated with users;
   identifying the electronic messages as a particular type of electronic message;
   parsing the electronic messages based at least in part on the identified particular type of electronic message;
   establishing timelines of activity patterns of the users based on information obtained from the parsed electronic messages;
   determining a measure associated with an effectiveness of an advertisement for various timelines; and
   providing a recommendation for an advertisement strategy based on the determination of the effectiveness of the advertisement for the various timelines.

20. The computer readable media of claim 19, the operations comprising determining that the advertisement has a higher effect on users associated with a particular timeline than other timelines, and recommending increasing an advertisement budget for targeting users associated with the particular timeline.

21. The computer readable media of claim 19, wherein at least one the electronic messages comprises a search query.

22. The computer readable media of claim 19, wherein the information obtained from the parsed electronic messages comprises information about a format of one of the electronic messages.

23. The computer readable media of claim 19, wherein establishing the timelines comprises collecting statistics on performance of groups of advertisements, and assigning categories to at least some of the groups of advertisements.

24. The computer readable media of claim 19, wherein at least one of the timelines comprises a timeline of predetermined types of activities.

25. The computer readable media of claim 19, wherein at least one of the timelines comprises a timeline of travel activities of one or more users.

26. The computer readable media of claim 25, wherein the travel activities comprise activities in connection with an airline service, a car rental service, or a hotel service.

27. The computer readable medium of claim 19, wherein parsing the electronic messages based at least in part on the identified particular type of electronic message comprises parsing the electronic messages by a parser that corresponds to the identified particular type of electronic message.

* * * * *

UNITED STATES PATENT AND TRADEMARK OFFICE
CERTIFICATE OF CORRECTION

PATENT NO. : 8,402,387 B1
APPLICATION NO. : 12/109279
DATED : March 19, 2013
INVENTOR(S) : Grim H. Iversen It is certified that error appears in the above-identified patent and that said Letters Patent is hereby corrected as shown below:

In the Claims:

Column 16, line 17; replace:
"3. The method of claim 1, wherin at least one the elec-" with
-- 3. The method of claim 1, wherein at least one of the elec- --

Column 16, line 66; replace:
"12. The system of claim 10, wherein at least one the elec-" with
-- 12. The system of claim 10, wherein at least one of the elec- --

Column 18, line 11; replace:
"least one the electronic messages comprises a search query." with
-- least one of the electronic messages comprises a search query." --

Column 18, line 29; replace:
"27. The computer readable medium of claim 19, wherein" with
-- 27. The computer readable media of claim 19, wherein --

Signed and Sealed this
Thirteenth Day of August, 2013

Teresa Stanek Rea
*Acting Director of the United States Patent and Trademark Office*